US008188716B2

(12) United States Patent
Kolosnitsyn et al.

(10) Patent No.: US 8,188,716 B2
(45) Date of Patent: May 29, 2012

(54) LITHIUM-SULPHUR BATTERY WITH A HIGH SPECIFIC ENERGY AND A METHOD OF OPERATING SAME

(75) Inventors: Vladimir Kolosnitsyn, Ufa (RU); Elena Karaseva, Ufa (RU)

(73) Assignee: Oxis Energy Limited, Oxfordshire (GB)

( * ) Notice: Subject to any disclaimer, the term of this patent is extended or adjusted under 35 U.S.C. 154(b) by 755 days.

(21) Appl. No.: 11/976,605

(22) Filed: Oct. 25, 2007

(65) Prior Publication Data
US 2008/0100264 A1    May 1, 2008

Related U.S. Application Data (60) Provisional application No. 60/856,045, filed on Nov. 2, 2006.

(30) Foreign Application Priority Data

Oct. 25, 2006    (GB) .................................. 0621197.3

(51) Int. Cl.
*H02J 7/00*    (2006.01)
(52) U.S. Cl. ....................................................... 320/127
(58) Field of Classification Search .................... 320/127
See application file for complete search history.

(56) References Cited

U.S. PATENT DOCUMENTS 4,012,562 A * 3/1977 Saunders ...................... 429/103
6,709,787 B2 * 3/2004 Zhao et al. .................... 429/213
2004/0126661 A1 7/2004 Nagayama et al.
2004/0175621 A1 9/2004 Iriyama et al.
2005/0202314 A1 * 9/2005 Cherng et al. ................ 429/130
2006/0127751 A1 6/2006 Woo
2007/0059602 A1 * 3/2007 Morishima et al. ........ 429/231.5

FOREIGN PATENT DOCUMENTS
JP    2005/071712 A    3/2005

OTHER PUBLICATIONS

G. Pistoia "Batteries for Portable Device" Elsevier 2005 p. 118.
David Linden, Thomas B. Reddy "Handbook of batteries" 3d ed. p. 34-42.
V. S. Kolosnitsyn, E. V. Karaseva, N. V. Shakirova, D. Y. Seung, and M. D. Cho "Cycling a Sulphur Electrode in Electrolytes Based on Sulfolane and Linear Ethers (Glymes) in an $LiCF_3SO_3$ Solution" Russian Journal of Electrochemistry, vol. 38, No. 12, 2002, pp. 1360-1363.

(Continued)

*Primary Examiner* — Arun Williams
(74) *Attorney, Agent, or Firm* — Pearl Cohen Zedek Latzer, LLP (57) ABSTRACT

A multi-electrode lithium-sulphur cell or battery including for example a negative electrode made of metal lithium, lithium alloys or lithium-absorbing materials; at least first and second distinct positive electrodes or groups of positive electrodes; and an electrolyte that is a solution of one or several salts in one or several solvents disposed between the negative and positive electrodes. The first positive electrode or group of positive electrodes is configured for charging, and the second positive electrode or group of positive electrodes is configured for discharging. The cell or battery has a high specific energy. Other embodiments of the present invention may include other structures and properties.

14 Claims, 3 Drawing Sheets

OTHER PUBLICATIONS

V. S. Kolosnitsyn, E. V. Karaseva, D. Y. Seung, and M. D. Cho "Cycling a Sulphur Electrode in Mixed Electrolytes Basedon Sulfolane: Effect of Ethers" Russian Journal of Electrochemistry, vol. 38, No. 12, 2002, pp. 1314-1318.

V. S. Kolosnitsyn, E. V. Karaseva, D. Y. Seung, and M. D. Cho, Cycling "A Sulphur Electrode Effect of Physicochemical Properties of Electrolyte Systems" Russian Journal of Electrochemistry, vol. 39, No. 10, 2003, pp. 1089-1093.

V. S. Kolosnitsyn, E. V. Karaseva, N. A. Amineva, and G. A. Batyrshina "Cycling Lithium-Sulphur Batteries" Russian Journal of Electrochemistry, vol. 38, No. 3, 2002, pp. 329-331.

Margaret V. Merritt, Donald T. Sawyer "Electrochemical reduction of elemental sulphur in aprotic solvents. Formation of a stable $S_8^-$ species" Inorg. Chem.—1970.—V.9.—pp. 211-215.

Robert P. Martin, William H. Doub, Jr., Julian L. Roberts, Jr., Donald T. Sawyer. "Further Studies of the Electrochemical Reduction of Sulphur in Aprotic Solvent" Inorg. Chem.—1973.—V. 12.—pp. 1921-1925.

Rauh R.D., Shuker F.S., Marston J.M., Brummer S.B. "Formation if Lithium Polysulphides in Aprotic Media" J. inorg. Nucl. Chem.—1977.—V.39.—pp. 1761-1766.

Yamin H., Gorenshtein A., Penciner J., Sternberg Y., Peled E. "Lithium Sulphur Battery. Oxidation/reduction Mechanisms of Polysulphides in THF Solution" J. Electrochem. Soc.—1988.—V. 135.—No. 5.—pp. 1045-1048.

Yamin H., Peled E. "Electrochemistry of a Nonaqueous Lithium/ Sulphur Cell" J. of Power Sources.—1983.—V. 9.—pp. 281-287.

Duck-Rye Chang, Suck-Hyun Lee, Sun-Wook Kim, Hee-Tak Kim "Binary Electrolyte Based on T etra (Ethylene Glycol) Dimethyl Ether and 1,3-Dioxolane for Lithium-Sulphur Battery" J. of Power Sources.—2002.—V. 112.—pp. 452-460.

John Newman and Karen E. Thomas-Alyea "Electrochemical System" Eqn. 22.31, $3^{rd}$ ed. p. 534.

Search report of Application No. GB0621197.3 dated Jan. 17, 2007.

Search report of Application No. GB0621197.3 dated Mar. 22, 2007.

* cited by examiner

LITHIUM-SULPHUR BATTERY WITH A HIGH SPECIFIC ENERGY AND A METHOD OF OPERATING SAME

PRIOR APPLICATION DATA

The present application claims the benefit of prior U.S. provisional patent application 60/856,045 filed on Nov. 2, 2006, and claims priority from prior UK patent application 0621197.3, filed on Oct. 25, 2006, each of which being incorporated by reference herein in its entirety.

TECHNICAL FIELD

The present invention relates to electrochemical power sources. In particular, it relates to the design of secondary chemical sources of electric energy comprising negative electrodes made of alkali metals and positive electrodes comprising sulphur and/or sulphur-based inorganic as well as organic (including polymeric) compounds as an electrode active material.

BACKGROUND OF THE INVENTION

Lithium-sulphur rechargeable batteries possess a high theoretic specific energy of 2600 Wh/kg. However, the practical specific energy of lithium-sulphur battery prototypes available today is in the range of 250-350 Wh/kg (Batteries for portable device. G. Pistoia. Elsevier 2005 P. 118; Handbook of batteries/David Linden, Thomas B. Reddy. 3d ed. P. 34.42), which is significantly lower than the theoretically anticipated value. The practical specific energy of lithium batteries is known to be 25-35% of the theoretical value. Therefore it could be expected that the practical specific energy of lithium-sulphur batteries would be about 780 Wh/kg (30% of 2600 Wh/kg). The lower value of the practically achieved specific energy of lithium-sulphur batteries as opposed to the theoretical value is determined by specific features of the electrochemical processes in lithium-sulphur batteries during their charge and discharge.

It is well known that elemental sulphur can exist in various molecular forms. Sulphur octet ($S^{+8}$) is the most stable state under normal conditions. Elemental sulphur is soluble (though very poorly) in many aprotic electrolyte systems. The molecular form of sulphur in many cases is the same in both solution and in the solid state.

During discharge of lithium-sulphur batteries, the electrochemical reduction of sulphur is realised in two stages (V. S. Kolosnitsyn, E. V. Karaseva, N. V. Shakirova, D. Y. Seung, and M. D. Cho, Cycling a Sulphur Electrode in Electrolytes Based on Sulfolane and Linear Ethers (Glymes) in an LiCF$_3$SO$_3$ Solution//Russian Journal of Electrochemistry, Vol. 38, No. 12, 2002, pp. 1360-1363; V. S. Kolosnitsyn, E. V. Karaseva, D. Y. Seung, and M. D. Cho, Cycling a Sulphur Electrode in Mixed Electrolytes Based on Sulfolane: Effect of Ethers//Russian Journal of Electrochemistry, Vol. 38, No. 12, 2002, pp. 1314-1318; V. S. Kolosnitsyn, E. V. Karaseva, D. Y. Seung, and M. D. Cho, Cycling a Sulphur Electrode: Effect of Physicochemical Properties of Electrolyte Systems//Russian Journal of Electrochemistry, Vol. 39, No. 10, 2003, pp. 1089-1093; V. S. Kolosnitsyn, E. V. Karaseva, N. A. Amineva, and G. A. Batyrshina, Cycling Lithium-Sulphur Batteries//Russian Journal of Electrochemistry, Vol. 38, No. 3, 2002, pp. 329-331).

Reduction of elemental sulphur in octet form dissolved in the electrolyte or the reduction of sulphur-containing compounds with the production of lithium polysulphides (the compounds being well soluble in electrolytes) takes place in the first stage of the lithium-sulphur battery discharge. The first products of the sulphur octet reduction, lithium octasulphides, are not stable in many electrolyte systems. Furthermore, they undergo reactions of disproportionation with a detachment of elemental sulphur, which again undergoes electrochemical reduction. A simplified process of sulphur octet reduction can be described by the following equations:

$$S_8 + 2e^- + 2Li^+ \rightarrow Li_2S_8 \qquad (1)$$

$$Li_2S_8 \rightarrow Li_2S_n + S_{(8-n)} \qquad (2)$$

However, the process of elemental sulphur reduction to lithium polysulphides is much more complicated. It is described in detail in the following papers (Margaret V. Merritt, Donald T. Sawyer. Electrochemical reduction of elemental sulphur in aprotic solvents. Formation of a stable $S_8^-$ species//Inorg. Chem.-1970.-V. 9.-pp. 211-215; Robert P. Martin, William H. Doub, Jr., Julian L. Roberts, Jr., Donald T. Sawyer. Further studies of the electrochemical reduction of sulphur in aprotic solvent//Inorg. Chem.-1973.-V. 12.-pp. 1921-1925; Rauh R. D., Shuker F. S., Marston J. M., Brummer S. B. Formation if lithium polysulphides in aprotic media//J. inorg. Nucl. Chem.-1977.-V. 39.-pp. 1761-1766; Yamin H., Gorenshtein A., Penciner J., Sternberg Y., Peled E. Lithium sulphur battery. Oxidation/reduction mechanisms of polysulphides in THF solution//J. Electrochem. Soc.-1988.-V. 135.-No. 5.-pp. 1045-1048).

In the second phase of lithium-sulphur discharge, a sequential reduction of lithium polysulphides dissolved in electrolyte takes place. It takes place with a gradual shortening of the polysulphide chain, Initially to short-chain lithium-polysulphides, and further to lithium sulphide and/or disulphide as final products, these compounds being poorly soluble in electrolyte (equations 3-5):

$$Li_2S_n + 2e^- + 2Li^+ \rightarrow Li_2S \downarrow + Li_2S_{(n-1)} \qquad (3)$$

$$Li_2S_{(n-1)} + 2e^- + 2Li^+ \rightarrow Li_2S \downarrow + Li_2S_{(n-2)} \qquad (4)$$

$$Li_2S_2 + 2e^- + 2Li^+ \rightarrow 2Li_2S \rightarrow \qquad (5)$$

In reality the electrochemical reduction mechanism of lithium polysulphides is more complicated.

The two-stage mechanism of the sulphur electrochemical reduction results in two plateaus in voltage on the charge and discharge curves for lithium-sulphur batteries. The first, higher plateau is characterized by a voltage of 2.5-2.0V relative to the lithium electrode and is explained by the reduction of elemental sulphur, while the second, lower plateau at a voltage of 2.1-1.5V is due to the reduction of lithium polysulphides.

The first voltage plateau on the charge curve (2.2-2.4V) occurs because of the oxidation of lithium sulphides and short-chain polysulphides into long-chain lithium polysulphides, while the second flat area (potentials of 2.4-2.7V) is due to the oxidation of long-chain lithium polysulphides to elemental sulphur.

At higher voltages, a higher plateau (Region A on FIG. 2, in one embodiment) is separated from a lower one (region B on FIG. 2 on FIG. 2, in another embodiment) by an inflection point The dissolution of lithium polysulphides in electrolytes results in an increase of electrolyte conductivity when concentrations of lithium polysulphides are low, and in a significant reduction of electrolyte electroconductivity at high concentrations of lithium polysulphides (Yamin H., Peled E. Electrochemistry of a nonaqueous lithium/sulphur cell//J. of Power Sources.-1983.-V. 9.-pp. 281-287; Duck-Rye Chang, Suck-Hyun Lee, Sun-Wook Kim, Hee-Tak Kim. Binary electrolyte based on tetra(ethylene glycol) dimethyl ether and 1,3-dioxolane for lithium-sulphur battery//J. of Power Sources.-2002.-V. 112.-pp. 452-460.). Moreover, the viscosity of the electrolyte solutions increases with the increase of the lithium polysulphide concentration.

The rate and the depth of the electrochemical reduction of lithium polysulphides are significantly dependent on the physical-chemical properties of the electrolyte system. The electroconductivity and viscosity of the electrolyte has a significant influence on the reduction depth of lithium polysulphides diluted in electrolyte solutions. The reduction in electroconductivity, as well as the increase in viscosity, results in a decrease of the depth of the reduction of the lithium polysulphides. This effect is observed from the shape of the discharge curves of the lithium-sulphur cells.

The discharge curves of the lithium-sulphur cells with electrolytes of different viscosities differ significantly (Duck-Rye Chang, Suck-Hyun Lee, Sun-Wook Kim, Hee-Tak Kim Binary electrolyte based on tetra(ethylene glycol) dimethyl ether and 1,3-dioxolane for lithium-sulphur battery//J. of Power Sources.-2002.-V. 112.-pp. 452-460). The higher the viscosity of the electrolyte solution, the shorter the low-voltage plateau on the lithium-sulphur discharge curve. The low-voltage plateau may not be present at all on discharge curves of lithium-sulphur cells with very high viscosity electrolyte solutions.

Therefore, in a porous positive electrode, the increase in viscosity of electrolyte solutions in the pores (which occurs due to the dilution of lithium polysulphides following the reduction of sulphur at the first discharge stage) results in a decrease of the depth of reduction of the lithium polysulphides, and hence in a reduction of the discharge capacity of the lithium-sulphur battery.

This phenomenon is known to limit the energy density of lithium-sulphur batteries.

The degradation in electrochemical properties of lithium-sulphur cells (when electrolyte electroconductivity decreases and the viscosity increases) occurs as a result of the displacement of the electrochemical reaction from the bulk volume of the positive electrode to its surface.

The positive electrodes of lithium-sulphur batteries typically comprise microporous systems filled with electrolyte. Since sulphur and the final products of sulphur reduction (lithium sulphide and lithium disulphide) are dielectric, some electron conductive compositions are normally added to the positive "sulphur" electrodes of lithium-sulphur batteries. Most often carbon materials are used for this purpose. The electron conductive compositions or materials are in one embodiment in particulate form.

The electrochemical reduction of sulphur during discharge normally occurs on the surface of the electron conducting particles. As the process proceeds, new lithium polysulphides are diluted in electrolyte within the pores of the positive electrode. The lithium polysulphide concentration in the electrolyte increases with the discharge of the sulphur electrode. This results in a gradual increase in the viscosity and decrease in the electroconductivity of the electrolyte.

The penetration rate of an electrochemical reaction product of an electrode into the bulk, is proportional to the square root of the ratio of the electroconductivity volume to the bulk rate of the electrochemical reaction, for example as shown at (Eqn. 22.31; Electrochemical system//John Newman and Karen E. Thomas-Alyea. $3^{rd}$ ed. P. 534):

$$L/v = (RT\kappa\sigma/((\alpha_a + \alpha_c) a i_0 F(\kappa + \sigma)))^{1/2}$$

Therefore, the decrease in electroconductivity of the electrolyte inside the pores of the positive electrode results in a displacement of the electrochemical reaction to the electrode surface and hence contributes to a decrease in sulphur utilisation (or sulphur-based compounds in embodiments of the present invention). This results in a lower specific energy of a lithium-sulphur cell.

The displacement of electrochemical reactions on to the sulphur electrode surface prevents the use of thicker porous cathodes in lithium-sulphur cells. The optimal thickness of sulphur electrodes is usually in the range of 15-30 µm, while the surface capacity is about 2-4 $mAh/cm^2$.

Poor electrochemical performance of thick sulphur electrodes is viewed as an obstacle to gaining higher specific energies in lithium-sulphur cells due to the disproportionately high contribution of auxiliary cell components to the total weight of a cell (current collectors, electrode tabs, separator, electrolyte, etc).

Some improvement of the electrochemical properties of the sulphur electrodes (increase in the penetration rate of electrochemical reaction into the bulk of an electrode) and hence improvement in capacity can be obtained by increasing the electrolyte content of a lithium-sulphur cell. When the amount of electrolyte is increased, high viscosity concentrated solutions of polysulphides in electrolyte do not form. Moreover, sulphur is completely reduced to its polysulphide forms. However, this also represents a significant compromise as the increased amount of electrolyte contributes additionally to the weight of the battery and does not provide any significant gain in the specific energy.

SUMMARY OF THE INVENTION

The lithium-sulphur electrochemical system possesses a high theoretical specific energy around 2600 Wh/kg. However, the specific energies achieved in practice are currently in the range of 250-350 Wh/kg (Batteries for portable device. G. Pistoia. Elsevier 2005 P. 118; Handbook of batteries/David Linden, Thomas B. Reddy. 3d ed. P. 34.42), which is significantly lower than that of the theoretical value. For lithium rechargeable batteries, the practical limit for the specific energy is known to be 25-35% of the theoretical value. On this basis, it may be expected ultimately to achieve as much as 780 Wh/kg in specific energy for a lithium-sulphur battery. At present, the specific energies achieved for lithium-sulphur batteries are still well below this practical limit.

Embodiments of the present invention seek to provide a new design of a lithium-sulphur battery which has a higher specific energy.

According to a first aspect of the present invention, there is provided a multi-electrode lithium-sulphur cell or battery comprising:

(a) at least one negative electrode made of metal lithium, lithium alloys or lithium-absorbing materials;
(b) at least first and second distinct positive electrodes or groups of positive electrodes; and
(c) an electrolyte that is a solution of one or several salts in one or several solvents disposed between the negative and positive electrodes;
(d) wherein the first positive electrode or group of positive electrodes is configured for charging, and wherein the second positive electrode or group of positive electrodes is configured for discharging.

A key feature is the provision of several (or several groups of) positive electrodes in the design of the lithium-sulphur cell or battery. Charging of the cell or battery is realised through one positive electrode (or group of positive electrodes), while discharge occurs through another positive electrode (or group of positive electrodes). The use of two (groups of) positive electrodes helps to avoid the formation of highly concentrated solutions of lithium polysulphides during charge and discharge and thereby helps to bring down the optimal ratio between the content of electrolyte and sulphur. The reduction of the electrolyte quantity which is required for the optimal performance of a lithium-sulphur battery provides an increase in the specific energy.

Preferably, at least one of the positive electrodes is a porous electrode made of one or more electron-conducting materials. The electron-conducting material may be carbon or at least one metal or metal compound that is resistant to corrosion in sulphide media.

Preferably, at least one of the positive electrodes contains sulphur or electrochemically active inorganic, organic or polymeric sulphur-based compounds.

According to another aspect of the present invention, there is provided a method of charging a lithium-sulphur cell or battery of the first aspect, wherein a charging current source is connected to the at least one negative electrode and only to the first positive electrode or group of electrodes.

According to another aspect of the present invention, there is provided a method of charging a lithium-sulphur cell or battery of the first aspect, wherein a charging current source is connected only to the first positive electrode or group of electrodes.

According to another aspect of the present invention, there is provided a method of discharging a lithium-sulphur cell or battery of the first aspect, wherein a load is connected between the at least one negative electrode and only the second positive electrode or group of electrodes.

According to another aspect of the present invention, there is provided a method of discharging a lithium-sulphur cell or battery of the first aspect, wherein a load is connected only to the second positive electrode or group of electrodes.

In the above aspects and embodiments, the first and second positive electrodes or groups of electrodes may be physically, electrically or otherwise distinct from each other.

Alternatively, the first and second positive electrodes or groups of electrodes may be configured such that the first electrode, or at least some of the first group of electrodes, also comprises the second electrode, or at least some of the second group of electrodes.

A method of charging a cell or battery may include providing or connecting a charging current source only to the first positive electrode, or providing or connecting a charging current source in addition to the negative electrode.

A method of discharging a cell or battery may include providing or connecting a load only to the second positive electrode, or providing a load between the negative electrode and only the second positive electrode.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

BRIEF DESCRIPTION OF THE DRAWINGS

For a better understanding of the present invention and to show how it may be carried into effect, reference shall now be made by way of example to the accompanying drawings, in which.

DETAILED DESCRIPTION OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, and components have not been described in detail so as not to obscure the present invention.

Figure 1:
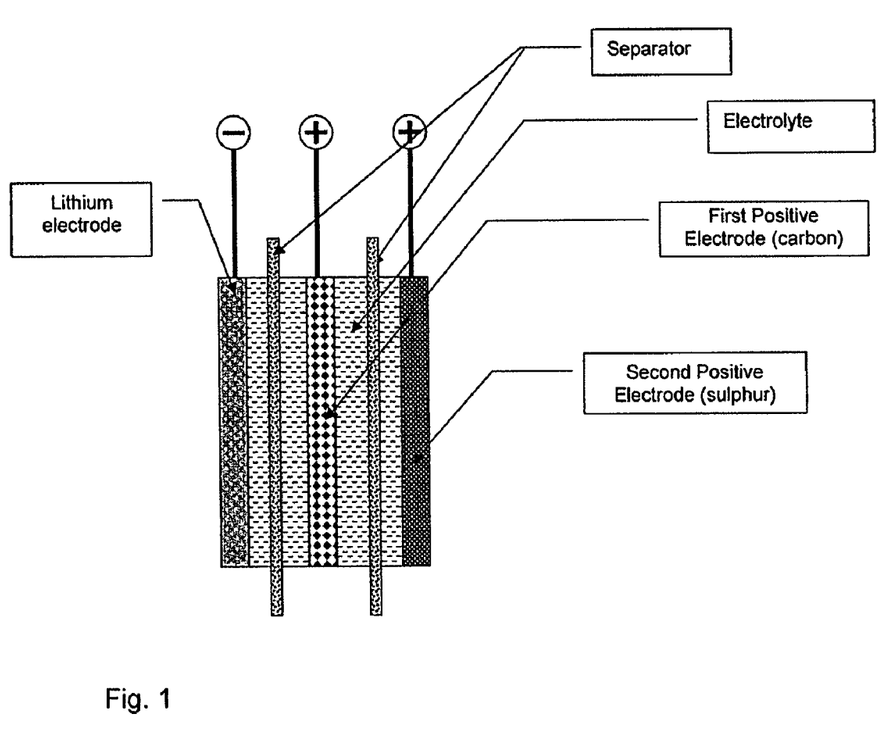
FIG. 1 is a schematic diagram of a lithium-sulphur cell of an embodiment of the invention including two (groups of) electrodes.

An improvement of the energy characteristics of known lithium-sulphur batteries can be achieved by preventing the formation of highly concentrated solutions of intermediate products of sulphur reduction (lithium polysulphides) during the charge and discharge of such lithium-sulphur batteries. It is proposed by the present applicant to have several (rather than one) positive electrodes in a lithium-sulphur battery. The positive electrodes are preferably connected in at least two groups. A schematic diagram of a lithium-sulphur cell comprising two (groups of) electrodes is shown in FIG. 1. In particular, there is shown a cell 1 comprising a lithium negative electrode 2, a first positive electrode 3 made of carbon, and a second positive electrode 4 made of sulphur. The negative electrode 2 is separated from the first positive electrode 3 by a separator 5; and the second positive electrode 4 is separated from the first positive electrode 3 by a separator 6. There is further provided an electrolyte 7 between the various electrodes.

The use of two (two groups of) positive electrodes 3, 4 allows spatial separation of the reactions of electrochemical reduction (oxidation) of sulphur and lithium polysulphides to prevent formation of highly concentrated solutions of lithium polysulphides. One positive electrode (or one group thereof) is used during charging of the lithium-sulphur battery charge while another one is used during discharge thereof.

The operating mechanism of a lithium-sulphur battery with two positive electrodes is as follows:

Oxidation of short-chain lithium polysulphides dissolved in the electrolyte to form long-chain lithium polysulphides will take place during charge at the positive electrode used for charging ("charge" electrode"). Schematically the process may be described as:

$$2Li_2S_k - 2e - 2Li^+ \rightarrow Li_{2(2k)} + 2Li^0. \quad (6)$$

The long-chain polysulphides diffuse towards the second positive electrode (or group of electrodes), that was not polarised during charge. Those long-chain polysulphides then interact with non-soluble products of complete sulphur reduction, lithium sulphide and lithium disulphide, which are present in the electrode pores:

$$Li_2S_{2k} + Li_2S \rightarrow 2Li_2S_{(k)} \quad (7)$$

The short-chain lithium polysulphides (soluble in electrolyte) are formed as a result of this reaction. They further diffuse towards the polarised positive electrode where they are electrochemically reduced to form longer-chain polysulphides. In such a way, charging of the multi-electrode lithium-sulphur battery continues until the oxidation of lithium sulphide and lithium disulphide is completed or until the pores of the charge electrode are fully filled. As a result, sulphur produced during the oxidation of lithium polysulphides is formed inside the positive electrode (electrodes) which was used for charging.

The cell discharge is realised via a load connected between the negative electrode and the positive electrode that was not polarised during charging. Initially, the reduction of sulphur dissolved in electrolyte occurs on this positive electrode. Long-chain and mid-chain lithium polysulphides that are well-soluble in the electrolyte are produced as a result of sulphur reduction during discharge. These polysulphides diffuse towards another (non-polarised during discharge) electrode, which contains elemental sulphur. The mid-chain polysulphides interact with elemental sulphur contained in this electrode so as to form long-chain polysulphides:

$$L_2S_k + nS \rightarrow Li_2S_{(k+n)}, \qquad (8)$$

where k=2-4.

The long-chain lithium polysulphides produced in this way diffuse towards the positive electrode, which is being polarised, where they are reduced to mid-chain lithium polysulphides. Thus, as a result of this shuttle process, the reduction of sulphur contained in the non-polarised electrode occurs on the polarised electrode. Highly concentrated and highly viscous solutions of lithium polysulphides in electrolyte are not produced during this processes allowing a significant increase the total capacity of the positive electrodes and hence the specific energy of lithium-sulphur batteries.

The charge and discharge of the battery can be realised by connecting various numbers of electrodes to form polarised and non-polarised groups of electrodes providing flexible control over the charge-discharge behaviour of a lithium-sulphur battery.

EXAMPLES

Example 1

An electrode comprising 90% of carbon and 10% of polytetrafluorethylene (PTFE) as a binder was produced as follows:
200 ml of isobutanol were added to 10 ml of 50% water suspension of polytetrafluorethylene (PTFE) and mixed carefully to obtain a homogeneous semitransparent white gel. 45 g of carbon black (Ketjenblack® EC-600JD, available from Akzo Nobel Polymer Chemicals BV, Netherlands) were put into an agate mortar. This gel was added to the carbon black and ground carefully to produce a homogeneous plastic slurry. Strips of 50 microns thick and 40 mm wide were fabricated from this slurry and it further pressurised on a roller press. Two such carbon strips were soaked in isobutanol for 30 minutes. These soaked carbon strips were used for making a carbon electrode by putting an aluminium grid between the strips and by further pressurising this stack in a roller press. The thickness of the resulting electrode was 100 microns, and its porosity was 84%.

Example 2

A positive electrode comprising 80% sublimated sulphur (available from Fisher Scientific, Loughborough, UK), 10% electro-conductive carbon black (Ketjenblack® EC-600JD, available from Akzo Nobel Polymer Chemicals BV, Netherlands) and 10% polytetrafluorethylene (PTFE) as a binder was produced as follows.

A mixture of dry components (carbon and sulphur) in mass ratio 1:8 was ground in a high-speed mill Microtron MB550 for 10-15 minutes. 200 ml of isobutanol was added to 10 ml of an aqueous suspension of polytetrafluorethylene (PTFE) and mixed carefully to obtain a homogeneous semitransparent white gel. 45 g of sulphur and carbon ground mixture was placed into an agate mortar. A PTFE gel thus produced was added to this mixture of dry substances and carefully ground to make a homogeneous plastic slurry. Carbon strips of 50 microns thick and 40 mm wide were fabricated from this slurry using a roller press. Then two carbon strips were put into isobutanol for 30 minutes for soaking. The electrodes were prepared from the soaked carbon strips in a roller press by pressurising two carbon strips with an aluminium grid between them. The thickness of the resulting electrode was 100 microns, its porosity was 74%, and its capacitance was 6.3 mAh/cm².

Example 3

The sulphur electrode from Example 2 was used in a small laboratory cell embedded in a stainless steel housing. The surface area of the electrodes was about 5 cm². The sulphur electrode was dried out in vacuum at +50 degrees Celsius for 24 hours. A Celgard® 3501 separator was used as a porous separator (a Trade Mark of Tonen Chemical Corporation, Tokyo, Japan, also available from Mobil Chemical Company, Films Division, Pittsford, N.Y.). A 38 microns thick lithium foil (Chemetall, Inc, USA) was used for the negative electrode. A 1.0M solution of lithium trifluoromethanesulfonate (available from 3M Corporation, St. Paul, Minn.) in sulfolane was used as an electrolyte.

Figure 2:
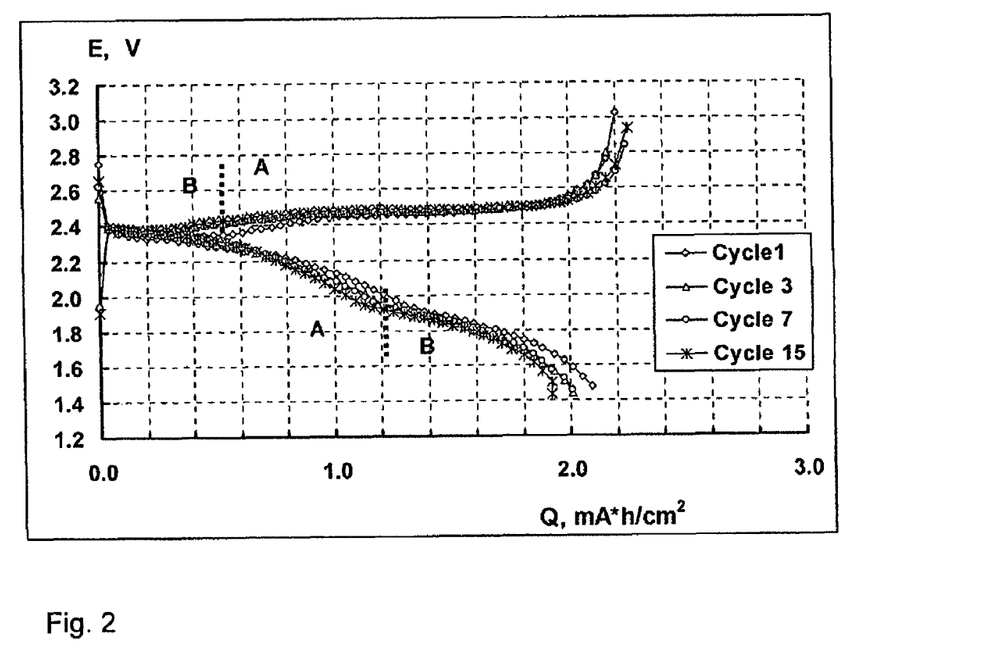
FIG. 2 shows a charge-discharge curve or plot for a conventional two electrode lithium-sulphur cell.

The cell was assembled in the following way. The preliminary dried sulphur electrode was placed into the stainless steel housing. The electrolyte was deposited onto the electrode by a syringe in the quantity necessary for complete soaking. Then the separator was placed onto the electrode. The electrolyte was deposited onto the separator by a syringe in the quantity necessary for complete soaking. Then the lithium electrode was placed onto the separator and the cell was hermetically sealed by a stainless steel cap. The cell was kept at a room temperature for 24 hours before cycling. A charge-discharge test was performed at a load 0.3 mA/cm² with the charge and discharge termination at 2.8V and 1.5V respectively. The charge-discharge curves obtained are shown in FIG. 2.

Example 4

The carbon electrode from Example 1 and the sulphur electrode from Example 2 were used in a small laboratory cell made housed in a stainless steel casing. The cell design provided an additional contact electrode.

The surface of each electrode was about 5 cm². The carbon electrode from Example 1 and the sulphur electrode from Example 2 were dried out in vacuum at +50 degrees Celsius for 24 hours before insertion into the cell. A Celgard® 3501 separator was used as a porous separator (a Trade Mark of Tonen Chemical Corporation, Tokyo, Japan, also available from Mobil Chemical Company, Films Division, Pittsford, N.Y.). A 38 micron thick lithium foil (supplied by Chemetall, Inc, USA) was used for the negative electrode. A 1.0M solution of lithium trifluoromethanesulfonate (available from 3M Corporation, St. Paul, Minn.) in sulfolane was used as the electrolyte.

The cell was assembled in the following way. The preliminarily dried sulphur electrode was placed into a stainless steel housing. The electrolyte was deposited onto the electrode by a syringe in a quantity necessary for complete soaking. Then the separator was placed onto the electrode. The electrolyte was deposited onto the separator by a syringe in a quantity necessary for complete soaking. Then the carbon electrode was placed onto the separator and soaked with electrolyte similar to the sulphur electrode. The separator soaked with electrolyte was placed onto the carbon electrode. Then the lithium electrode was placed onto the separator and the cell was hermetically sealed. The cell was kept at room temperature for 24 hours before cycling.

A charge-discharge cycling of the cell was performed at a load of 0.3 mA/cm$^2$ with charge and discharge termination at 2.8V and 1.5V respectively.

Figure 3A:
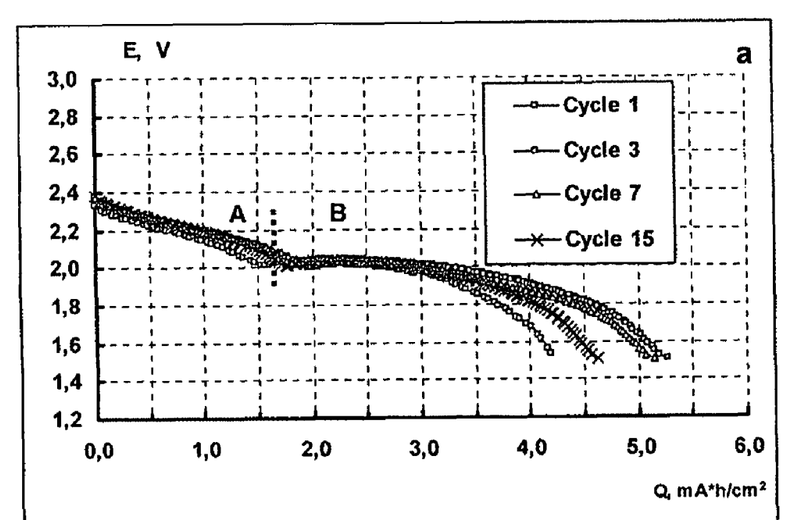
FIG. 3A shows a discharge plot for the cell of FIG. 1.
Figure 3B:
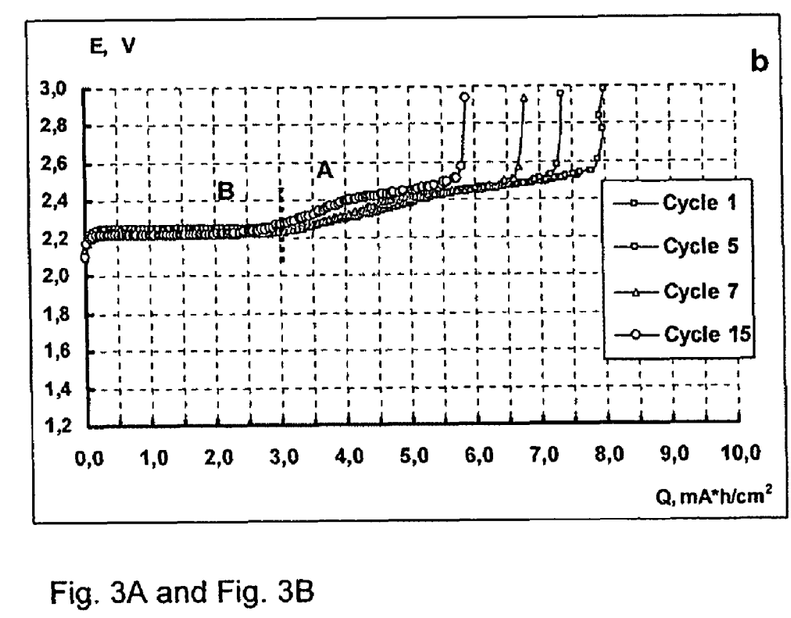
FIG. 3B shows a charge plot for the cell of FIG. 1.

The charging of the cell was carried out using lithium and sulphur electrodes. The discharge was performed using lithium and carbon electrodes. The charge-discharge curves obtained are shown in FIG. 3. FIG. 3 shows discharge (a) and charge (b) curves on a three electrode lithium-sulphur cell While the invention has been described with respect to a limited number of embodiments, it will be appreciated that many variations, modifications and other applications of the invention may be made. Embodiments of the present invention may include other apparatuses for performing the operations herein. Such apparatuses may integrate the elements discussed, or may comprise alternative components to carry out the same purpose. It will be appreciated by persons skilled in the art that the appended claims are intended to cover all such modifications and changes as fall within the true spirit of the invention.

The invention claimed is:

1. A multi-electrode lithium-sulphur cell comprising:
    (a) at least one negative electrode made of metal lithium, lithium alloys or lithium-absorbing materials;
    (b) at least first and second positive electrodes, wherein the first and second positive electrodes are electrically distinct from each other; and
    (c) an electrolyte that is a solution of one or several salts in one or several solvents disposed between the negative and positive electrodes;
    (d) wherein the first positive electrode is configured for charging, and wherein the second positive electrode is configured for discharging.

2. A cell as claimed in claim 1, wherein at least one of the positive electrodes comprises a porous electrode made of one or more electron-conducting materials.

3. A cell as claimed in claim 2, wherein the electron-conducting material is carbon or at least one metal or metal compound that is resistant to corrosion in a sulphide media.

4. A cell as claimed in claim 1, wherein at least one of the positive electrodes contains sulphur, an electrochemically active inorganic sulphur comprising compound, an organic sulphur comprising compound or polymeric sulphur-comprising compounds.

5. A cell as claimed claim 1, wherein the first and second positive electrodes are physically distinct from each other.

6. A cell as claimed in claim 1, wherein the first and second positive electrodes are configured such that the first electrode comprises the second electrode.

7. The cell of claim 1 wherein each of the first and second positive electrodes comprise a plurality of groups of positive electrodes.

8. The cell as claimed in claim 1, wherein a charging current source or a load is alternatively connected:
    (a) to only the first positive electrode or more than one first positive electrodes; or
    (b) to only the second positive electrode or more than one second positive electrodes.

9. A battery comprising the multi-electrode lithium-sulphur cell comprising:
    (a) at least one negative electrode made of metal lithium, lithium alloys or lithium-absorbing materials;
    (b) at least first and second positive electrodes, wherein the first and second positive electrodes are electrically distinct from each other; and
    (c) an electrolyte that is a solution of one or several salts in one or several solvents disposed between the negative and positive electrodes;
    (d) wherein the first positive electrode is configured for charging, and wherein the second positive electrode is configured for discharging.

10. A method for charging multi-electrode lithium-sulphur cell, the cell comprising:
    (a) at least one negative electrode made of metal lithium, lithium alloys or lithium-absorbing materials;
    (b) at least first and second positive electrodes, wherein the first and second positive electrodes are electrically distinct from each other; and
    (c) an electrolyte that is a solution of one or several salts in one or several solvents disposed between the negative and positive electrodes;
    (d) wherein the first positive electrode is configured for charging, and wherein the second positive electrode is configured for discharging:
the method comprising providing a charging current source only to the first positive electrode.

11. The method of claim 10, wherein the negative electrode is configured for charging and wherein the method comprises providing a charging current source to the negative electrode.

12. A method for discharging multi-electrode lithium-sulphur cell, the cell comprising:
    (a) at least one negative electrode made of metal lithium, lithium alloys or lithium-absorbing materials;
    (b) at least first and second positive electrodes, wherein the first and second positive electrodes are electrically distinct from each other; and
    (c) an electrolyte that is a solution of one or several salts in one or several solvents disposed between the negative and positive electrodes;
    (d) wherein the first positive electrode is configured for charging, and wherein the second positive electrode is configured for discharging,
the method comprising discharging the cell by connecting a load only to the second positive electrode.

13. The method according to claim 12 comprising discharging the cell by providing a load between the negative electrode and only the second positive electrode.

14. An electrochemical cell, for storing electrical energy by receiving a charge from a current source and releasing electrical energy by discharging across a load source, comprising:
    (a) at least one negative electrode made of metal lithium, lithium alloys or lithium-absorbing materials, said at least one negative electrode constructed and arranged to receive said charge from said current source and releasing energy by discharging across a load source;
    (b) an electrolyte that is a solution of one or several lithium salts in one or several solvents;
    (c) at least one first positive electrode constructed and arranged to receive said current and participate in electrochemical reactions with said at least one negative electrode and the electrolyte, as said cell is receiving charge from a current source, which electrochemical reactions comprise oxidation of short-chain lithium polysulfides in the electrolyte to long-chain polysulfides at the at least one first positive electrode;

(d) at least one second positive electrode constructed and arranged to produce current and to participate in electrochemical reactions with said negative electrode and an electrolyte, as said cell releases electrical energy by discharging across said load source, which electrochemical reactions comprise reducing sulfur dissolved in the electrolyte to form soluble mid-chain and long-chain lithium polysulfides at the at least one second positive electrode;

(e) the electrolyte disposed between the negative and positive electrodes, said electrolyte participating in lithium sulfur reactions with said at least one negative electrode, said at least one first positive electrode and said at least one second positive electrode, circulating lithium polysulfides between said at least one first positive electrode and said at least one second positive electrode; and (f) wherein said at least one first positive electrode is configured for charging, and wherein said at least one second positive electrode is configured for discharging.

* * * * *